United States Patent Office 2,984,660
Patented May 16, 1961

2,984,660
DISAZO-DYESTUFF INSOLUBLE IN WATER

Joachim Ribka, Offenbach (Main), Germany, assignor to Farbwerke Hoechst Aktiengesellschaft vormals Meister Lucius & Brüning, Frankfurt am Main, Germany, a corporation of Germany No Drawing. Filed May 5, 1959, Ser. No. 811,009
Claims priority, application Germany May 23, 1958
1 Claim. (Cl. 260—176)

The present invention relates to a new valuable disazo-dyestuff insoluble in water and to a process for preparing the same; more particularly it relates to a dyestuff corresponding to the following formula

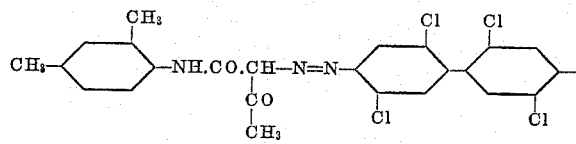

I have found that a new valuable disazo-dyestuff insoluble in water is obtained by coupling in substance, on

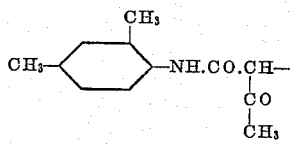

the fiber or on another substratum the tetrazonium compound from 4,4′-diamino-2,2′,5,5′-tetrachlorodiphenyl with 1-acetoacetylamino-2,4-dimethylbenzene.

The new dyestuff yields on vegetable fibers including those of regenerated cellulose valuable yellow dyeings and prints according to known dyeing and printing methods.

The dyestuff represents a greenish-yellow pigment insoluble in water. Owing to its good fastness to solvents and very good fastness to light, this pigment is particularly suitable for coloring plastic masses, for graphic printing and for special technical fields of the lacquer, wallpaper and paper industry. The new dyestuff can also be applied to textile materials by padding or pigment printing or it may be used for coloring natural and synthetic resins.

The following example serves to illustrate the invention, but it is not intended to limit it thereto, the parts being by weight.

Example 32.2 parts of 4,4′-diamino-2,2′,5,5′-tetrachlorodiphenyl are tetrazotized in the usual manner. The tetrazo solution so obtained is then coupled in known manner with a suspension of 41 parts of 1-acetoacetylamino-2,4-dimethylbenzene in acetic acid prepared in the presence of a reaction product of about 20 mols of ethylene oxide with 1

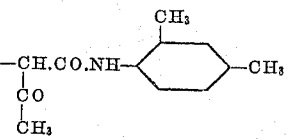

mol of oleyl alcohol. After completion of the dyestuff formation, the dyestuff corresponding to the formula

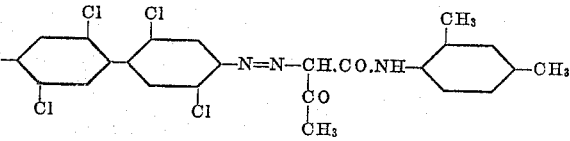

is filtered off with suction, washed and dried. The dyestuff so obtained is a greenish yellow powder.

The coupling can also be carried out in the presence of a substratum adapted for the preparation of color lakes.

I claim:

The water-insoluble disazo-dyestuff corresponding to the following formula:

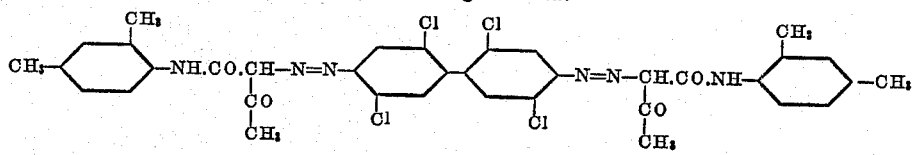

References Cited in the file of this patent
UNITED STATES PATENTS

| | | |
|---|---|---|
| 1,932,577 | Eichwede et al. | Oct. 31, 1933 |
| 2,657,204 | De Lucia et al. | Oct. 27, 1953 |
| 2,880,177 | Lyons et al. | Mar. 31, 1959 |